Patented Dec. 11, 1928.

1,694,414

UNITED STATES PATENT OFFICE.

GEORGE HOLLAND ELLIS, OF SPONDON, NEAR DERBY, ENGLAND, ASSIGNOR TO CELANESE CORPORATION OF AMERICA, A CORPORATION OF DELAWARE.

DYEING, PRINTING, OR STENCILING OF CELLULOSE ACETATE.

No Drawing. Application filed March 10, 1926, Serial No. 93,779, and in Great Britain March 18, 1925.

This invention relates to the dyeing, printing or stenciling (all hereinafter in the claims included in the term dyeing) of threads, fabrics, films or other products or articles made with or containing cellulose acetate.

It has not hitherto been proposed to employ for the dyeing of cellulose acetate coloring matters or compounds of the stilbene group, which group is characterized by the chemical grouping $$\begin{array}{c} CH-R \\ \| \\ CH-R \end{array}$$

(where R is an aryl residue).

Existing dyestuffs of the stilbene group, owing to the presence in their constitution of sulpho groups, have little or no coloring power for cellulose acetate, and none of the existing dyes of this group produce sufficient depth of color on cellulose acetate for practical purposes.

I have now found that coloring matters or compounds of the stilbene group containing no sulpho groups in their constitution may be usefully employed in the practical dyeing, printing or stenciling of cellulose acetate.

Some examples of coloring matters or compounds of the stilbene group which may be employed for the purpose of the present invention are for instance:—

*Stilbene disazobisphenol.*

$$\begin{array}{l} CH-C_6H_4-N_2-C_6H_4OH \\ \| \\ CH-C_6H_4-N_2-C_6H_4OH \end{array} \} \text{which yields yellow shade on cellulose acetate.}$$

*Stilbene disazobismetatoluidine.*

$$\begin{array}{l} CH-C_6H_4-N_2-C_6H_3-NH_2CH_3 \\ \| \\ CH-C_6H_4-N_2-C_6H_3-NH_2CH_3 \end{array} \} \text{which yields gold shades on cellulose acetate.}$$

*Stilbene disazobisalphanaphthylamine.*

$$\begin{array}{l} CH-C_6H_4-N_2C_{10}H_6-NH_2 \\ \| \\ CH-C_6H_4-N_2C_{10}H_6-NH_2 \end{array} \} \text{which yields red shade on cellulose acetate.}$$

*Aminostilbene-azo-metaphenylenediamine*

$$\begin{array}{l} CH-C_6H_4-NH_2 \\ \| \\ CH-C_6H_4-N_2-C_6H_3(NH_2)_2 \end{array} \} \text{which yields gold shade on cellulose acetate.}$$

*Aminostilbene-azo-metatoluidine*

$$\begin{array}{l} CH-C_6H_4-NH_2 \\ \| \\ CH-C_6H_4-N_2-C_6H_3-NH_2\cdot CH_3 \end{array} \} \text{which yields yellow shade on cellulose acetate.}$$

It is understood that the invention is in no way limited to these examples and that any other unsulphonated coloring matters or compounds of the stilbene series may be employed.

In the case of azo stilbene coloring matters or compounds these may, alternatively to being applied as such, be formed within the fibre by coupling the diazotized amino stilbenes with suitable developers, such for instance as phenol, pyrazolone derivatives,—for example phenylmethylpyrazolone,—dialkylanilines, metadiamines, naphthylamines, naphthols, resorcine, oxynaphthoic acid and the like. Thus, for example, diaminostilbene applied to cellulose acetate yields the following shades on diazotization and development with the various developers:—

| | |
|---|---|
| Phenol | Gold |
| 1-phenyl-3-methyl-5-pyrazolone | Red |
| Diethylaniline | Red |
| Metaphenylenediamine | Reddish-brown |
| Alphanaphthylamine | Reddish-brown |
| Betanaphthol | Plum |
| Resorcine | Plum |
| Betaoxynaphthoic acid | Black |

The unsulphonated coloring matters or compounds or amino stilbenes may be applied to the goods of or containing cellulose acetate by any suitable method. More particularly they may be applied in solubilized or colloidally dispersed forms prepared by the methods respectively described in the specifications of my previous United States Patents 1,618,413 and 1,618,414, February 22, 1927, and application S. No. 50,525 or in the British specifications 219349, 224925 and 242393 corresponding respectively to my said United States applications, or by the method described in the specification of the United States application Serial No. 48,666 of myself and W. O. Goldthorpe.

The method indicated in the specification of my said U. S. Patent 1,618,413 and the British specification No. 219349 corresponding thereto, consists in a pretreatment with sulphoricinoleic acid or other bodies having oily or fatty characteristics, namely higher fatty acids or sulphonated or other derivatives thereof containing salt forming groups capable of forming soluble salts with alkalies or ammonia (for example the sulpho group or the carboxyl group or both sulpho and carboxyl groups) or with salts of such acids or bodies, for instance their alkali or ammonium salts, or with a mixture of two or more of these solubilizing agents. All such bodies and their salts are hereinafter, as in the said U. S. application, included in the term "bodies of oily or fatty characteristics."

The method indicated in my U. S. Patent 1,618,414 and British specification No. 224925 consists in a pretreatment with carbocyclic solubilizing agents, that is to say carbocyclic compounds containing in their structure one or more salt forming groups or sodium or other salts of said compounds, or with mixtures of such carbocyclic compounds or salts, or mixtures of one or more thereof with one or more of the solubilizing agents of my said U. S. Patent 1,618,413 or the British specification No. 219349; instances of such carbocyclic solubilizing agents indicated in my U. S. Patent 1,618,414 and the corresponding British specification No. 224925 are naphthenic acids, naphthene sulphonic acids or other carboxylic or sulphonic acids of the cyclo-paraffins, phenols, sulphonic acids, carboxylic acids, phenol sulphonic acids or other derivatives of the benzene, naphthalene or anthracene series, or other derivatives of saturated or non-saturated cyclic hydrocarbons containing one or more salt forming groups, or sodium or other salts of any of such compounds.

The method indicated in my U. S. application S. No. 50,525 and the corresponding British specification No. 242393 consists in a pretreatment with solubilizing agents consisting of or comprising one or more Twitchell reagents, which expression includes sulphoaromatic fatty acids such as sulpho-benzene stearic acid, sulphophenol stearic acid or sulphonaphthalene stearic acid and salts of sulpho aromatic fatty acids.

The method indicated in the U. S. application S. No. 48,666 of myself and W. O. Goldthorpe consists in the employment in conjunction with the aforesaid solubilizing agents of the before mentioned U. S. Patent 1,618,413 (or British specification No. 219349) of auxiliary solvents, the coloring matter or compound being treated with one or more of the solubilizing agents of the U. S. Patent 1,618,413 (or British specification 219349) and one or more auxiliary solvents in any order separately, or together in admixture at any suitable temperature or pressure, in presence or absence of water.

The specification of U. S. application S. No. 48,666, indicates as such auxiliary solvents:—alkyl or alkylene halides, for example tetrachlorethane, trichlorethylene; simple or "mixed" derivatives of the cyclic or aromatic series containing one or more amino, chlor or hydroxy groups, such for example as cresols, alkylanilines, toluidines, chlorphenols, mono or poly chlorbenzenes; hydrogenated derivatives of such or other aromatic compounds, such for example as hexahydrophenol, hexahydrocresols, hexahydrobenzene, dekahydronaphthalene, tetrahydronaphthalene, and the like.

While the said unsulphonated coloring matters or compounds of the stilbene group or the said amino stilbenes may be more particularly applied in solubilized or colloidally dispersed forms prepared according to the methods of said U. S. Patents 1,618,413, 1,618,414, and application 50,525 or corresponding British specifications 219349, 224925 and 242393, or according to the method of said United States application S. No. 48,666, they may be applied in any other suitable way. For instance, they may be very finely ground and suspended in aqueous baths or pastes to which may be added if desired protective colloids, such as glue, dextrine, gelatine, gums and the like. Or the fine suspensions may be formed by first dissolving in a suitable organic solvent and then pouring into water, for instance into the dye-bath, to which may be added, if desired, protective colloids such as glue, dextrine, gelatine, gums and the like.

In cases where development is desired or necessary, that is to say when the coloring matter itself is formed on the fibre or where the coloring matter itself has one or more diazotizable amino groups, the diazotization and coupling may be achieved in any suitable manner. The coupling bath may be acid, alkaline, or neutral as best suited to the developer employed.

The unsulphonated stilbene coloring matters or compounds may be employed for the dyeing, printing or stenciling of mixed yarns, fabrics or materials containing cellulose acetate fibres, filaments or yarns associated with other materials, for example cotton or other yarns or fibres of the cellulose type (natural or artificial) wool, silk, and so forth.

Usually the said unsulphonated stilbene coloring matters or compounds have but little or no affinity for threads or fibres other than cellulose acetate threads or fibres. Thus mixed goods can be dyed, stenciled or printed to show resist, differential or solid effects as desired, appropriate dyes or coloring agents being applied if desired or required for the non-acetate portion of the mixed material, either separately or simultaneously with the unsulphonated coloring matters or compounds.

The following are some examples of the manner in which the invention may be performed, it being understood that these are given only by way of illustration and can be varied widely without departing from the invention.

*Example 1.*

1 lb. of stilbene disazometatoluidine of the constitution:—

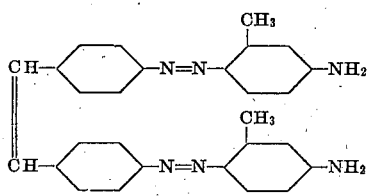

is milled to a fine paste with 10 lbs. of water, and dredged into a dyebath containing 300 gallons of soft water, to which may advantageously be added 2–3 lbs. of olive oil soap. 100 lbs. of cellulose acetate yarn in hank form are now entered, the dyebath raised to 75–80° C. in 45 minutes, and maintained at this temperature a further 45 minutes. The material, which is dyed a full bright gold, is lifted, rinsed well, and dried and finished as desired.

*Example 2.*

5 lbs. of stilbene disazoalphanaphthylamine 20% paste, of the constitution:— are pasted with sufficient water to a thin consistency, and passed through straining cloth into a dyebath containing 300 gallons of soft water, to which may advantageously be added 2–3 lbs. of glue. 100 lbs. of cellulose acetate yarn in hank form are now entered, and dyeing carried out as in the previous example. The material which is dyed a red shade is lifted, rinsed well and dried and finished as desired.

*Example 3.*

1 lb. of stilbene disazo phenol, of the constitution:—

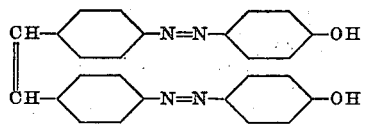

is solubilized by being finely ground or milled and mixed with 6 lbs. neutral 50% Turkey red oil and 3 lbs. of water. This is then made up to 20 gallons with boiling soft water and passed through a straining cloth into a dyebath containing 300 gallons of soft water. 100 lbs. of cellulose acetate in hank form are now entered, and dyeing is carried out as in the previous example. The cellulose acetate is dyed a full bright yellow color. After the operation it may be dried and finished as desired.

*Example 4. Dyeing by the azoic method.*

(*a*) *Dyeing.*—2 lbs. of diaminostilbene are solubilized by warming with 10 lbs. 50% Turkey red oil. This is then let down to 20 gallons with boiling soft water, and passed through a straining cloth into a dyebath containing 300 gallons of soft water. 100 lbs. of cellulose acetate in hank form are now entered, and worked as in the previous examples. The hanks, which have assumed a faint yellow tint, are washed twice with soft water, and finally in hard water. They are now ready for diazotizing and developing.

Alternatively the diaminostilbene may be dissolved as the hydrochloride, in 300 gallons of water, and dyeing be carried out at 75–80° C. for one hour, the dyebath being finally exhausted by the addition of 5–10 lbs. sodium acetate.

(*b*) *Diazotization.*—After treating with the amino base, the goods are entered cold into 150 gallons of water containing 5 lbs. of sodium nitrite and 16 lbs. of hydrochloric acid 28° Tw.; the goods are turned for ½ hour, lifted and rinsed.

(*c*) *Developing with beta-oxynaphthoic acid.*—4 lbs. betaoxynaphthoic acid are dissolved in water containing ¾ lb. caustic soda, and added to 200 gallons of soft water containing 5 lbs. of glue in solution; 50 lbs. of 10% acetic acid are now added, and the material from the above operations is entered. The bath is raised to 50–60° C. in ¾ hour and developing is continued at this temperature for ½ hour. The material which is now a full bloomy bluish black, is soaped for ten minutes at 45° C. in a 300 gallon bath containing 2 lbs. olive oil soap and then well rinsed, dried and finished as desired.

*Example 5.*

1 lb. of stilbene disazophenol of the constitution:—

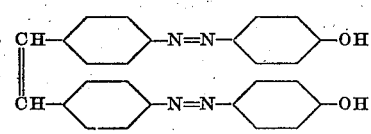

is finely ground and mixed with 9 lbs. of naphthenic acid. The mass is then heated and stirred until sufficiently homogeneous; water or soap solution, preferably hot, is then added, and sufficient caustic soda to give a slight alkaline reaction. The mixture is then boiled, diluted with boiling soft water and passed through a straining cloth into the dyebath. 100 lbs. of cellulose acetate yarn in hank form are now entered, and dyeing is carried out as before. The material is dyed a full bright yellow, is lifted, rinsed and finished as desired.

*Example 6.*

5 lbs. of stilbene disazo alphanaphthylamine 20% paste of the constitution:—

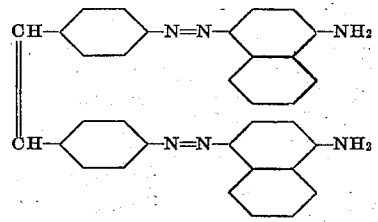

are pasted with 5 lbs. of the sulphoaromatic fatty acid compound obtained by sulphonating a mixture of naphthalene and oleic acid generally as described for the production of sulphoaromatic fatty acids in my said previous United States application S. No. 50,525 and said British specification No. 242,393. The homogeneous paste is diluted to 20 gallons with boiling soft water, dredged into a bath containing 250 gallons soft water, and 100 lbs. cellulose acetate yarn in hank form are entered. Dyeing is carried out as before. The cellulose acetate which is dyed a red shade, may be further diazotized and developed to give useful brown to black shades.

*Example 7.*

1 lb. of dry finely powdered amino stilbene azo metaphenylenediamine of the constitution:—

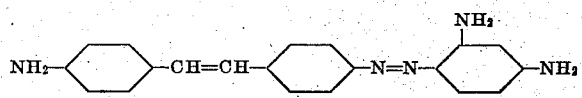

is heated for 5–10 minutes at 70–80° C. with 2½ lbs. tetrahydronaphthalene, with good stirring; 10 lbs. 50% Turkey red oil are added and the whole is pasted at this temperature, with the addition of a little soft water if necessary, till the deystuff is completely solubilized. This is then let down to 20 gallons with boiling soft water and added to the dyebath, and dyeing is carried out as in Example 1. The cellulose acetate is dyed a clear yellow shade.

What I claim and desire to secure by Letters Patent is:—

1. Process for dyeing materials comprising cellulose acetate, comprising dyeing the materials with unsulphonated stilbene coloring compounds.

2. Process for dyeing materials comprising cellulose acetate, comprising dyeing the materials with unsulphonated azo-stilbene coloring compounds.

3. Process for dyeing materials comprising cellulose acetate, comprising dyeing the materials with unsulphonated azo-stilbene coloring compounds by first treating with a stilbene compound containing a diazotizable amino group, diazotizing and developing.

4. Process for dyeing materials comprising cellulose acetate, comprising dyeing the materials with unsulphonated azo-stilbene coloring compounds by first treating with a stilbene compound containing a diazotizable amino group, diazotizing and developing with a β-oxynaphthoic acid developer.

5. Process for dyeing materials comprising cellulose acetate, comprising dyeing the materials with unsulphonated stilbene coloring compounds in aqueous colloidal solution.

6. Process for dyeing materials comprising cellulose acetate, comprising dyeing the materials with unsulphonated stilbene coloring compounds in aqueous colloidal solution obtained by pretreating the compounds with solubilizing agents.

7. Process for dyeing materials comprising cellulose acetate, comprising dyeing the materials with unsulphonated stilbene coloring compounds in aqueous colloidal solution obtained by pretreating the compounds with bodies of oily or fatty characteristics.

8. Process for dyeing materials comprising cellulose acetate, comprising dyeing the materials with unsulphonated stilbene coloring compounds in aqueous colloidal solution obtained by pretreating the compounds with a salt of sulphoricinoleic acid.

9. Process for dyeing materials comprising cellulose acetate, comprising dyeing the materials with unsulphonated azo-stilbene coloring compounds by first treating with a stilbene compound containing a diazotizable amino group in aqueous colloidal solution, diazotizing and developing.

10. Process for dyeing materials comprising cellulose acetate and another fibre, comprising dyeing the materials with unsulphonated stilbene coloring compounds.

11. Process for dyeing materials comprising cellulose acetate and another fibre, comprising dyeing the materials with unsulphonated azo-stilbene coloring compounds.

12. Process for dyeing materials comprising cellulose acetate and another fibre, comprising dyeing the materials with unsulphonated azo-stilbene coloring compounds by first treating with a stilbene compound containing a diazotizable amino group, diazotizing and developing.

13. Process for dyeing materials comprising cellulose acetate and another fibre, comprising dyeing the materials with unsulphonated stilbene coloring compounds in aqueous colloidal solution.

14. Process for dyeing materials comprising cellulose acetate and another fibre, comprising dyeing the materials with unsulphonated stilbene coloring compounds in aqueous colloidal solution obtained by pretreating the compounds with solubilizing agents.

15. Process for dyeing materials comprising cellulose acetate and another fibre, comprising dyeing the materials with unsulphonated stilbene coloring compounds in aqueous colloidal solution obtained by pretreating the compounds with bodies of oily or fatty characteristics.

16. Process for dyeing materials comprising cellulose acetate and another fibre, comprising dyeing the materials with unsulphonated stilbene coloring compounds in aqueous colloidal solution obtained by pretreating the compounds with a salt of sulphoricinoleic acid.

17. Materials comprising cellulose acetate dyed with unsulphonated stilbene coloring compounds.

18. Materials comprising cellulose acetate dyed with unsulphonated azo-stilbene coloring compounds.

In testimony whereof I have hereunto subscribed my name.

GEORGE HOLLAND ELLIS.